United States Patent [19]

Djelić

[11] Patent Number: 4,739,626
[45] Date of Patent: Apr. 26, 1988

[54] COOL-AIR COOLING BOX FOR MOTOR VEHICLES

[76] Inventor: Titomir Djelić, Langestr. 2, 6000 Frankfurt/M, Fed. Rep. of Germany

[21] Appl. No.: 34,541

[22] Filed: Apr. 6, 1987

[51] Int. Cl.⁴ .............................................. F25D 17/04
[52] U.S. Cl. ...................................... 62/244; 62/332; 62/410; 62/457
[58] Field of Search ............................... 62/410–412, 62/180, 332, 244, 457

[56] References Cited

U.S. PATENT DOCUMENTS

| | | | |
|---|---|---|---|
| 1,626,835 | 5/1927 | James | 62/412 X |
| 3,810,367 | 5/1974 | Peterson | 62/457 |
| 4,023,947 | 5/1977 | Ferry | 62/332 X |
| 4,175,401 | 11/1979 | McManus | 62/180 |
| 4,186,564 | 2/1980 | Myers | 62/180 |
| 4,236,749 | 12/1980 | Schluns | 62/244 X |
| 4,245,481 | 1/1981 | McDermott | 62/180 X |
| 4,258,555 | 3/1981 | Scharm et al. | 62/244 |
| 4,267,700 | 5/1981 | Minter | 62/457 X |
| 4,446,705 | 5/1984 | Loucks | 62/457 X |
| 4,642,999 | 2/1987 | Justice | 62/457 X |

Primary Examiner—William E. Tapolcai
Attorney, Agent, or Firm—Erwin S. Teltscher

[57] ABSTRACT

A cooling arrangement for use in continuously keeping cool edible substances, such as foodstuffs and/or beverages, while being transported in a motor vehicle having an outside air ventilation system and an air conditioning system, includes a cooling box bounding an internal space for accommodating the edible substances and having an air inlet and an air outlet situated across the internal space from one another; and a cooling system including a first and a second inlet respectively connected to the ventilation system and to the air conditioning system of the motor vehicle, an outlet connected to the air inlet of the cooling box, and a three-port valve device interposed between the inlets and the outlet of the cooling system and operative for selectively connecting the first and second inlets with the outlet of the cooling system and for controlling the amount of air flowing through the outlet of the cooling system and then past the edible substances accommodated in the cooling box to be discharged through the outlet opening of the cooling box. The cooling box has a space for the accommodation of, for instance, sandwiches, and of a holding frame which holds cans. The cooliong box further has an intermediate deposit shelf for supporting, for instance, documents, and a closing lid component which has a receptacle for receiving audio cassettes. The internal space of the cooling box can be subdivided in any desired manner.

15 Claims, 1 Drawing Sheet

U.S. Patent
Apr. 26, 1988
4,739,626
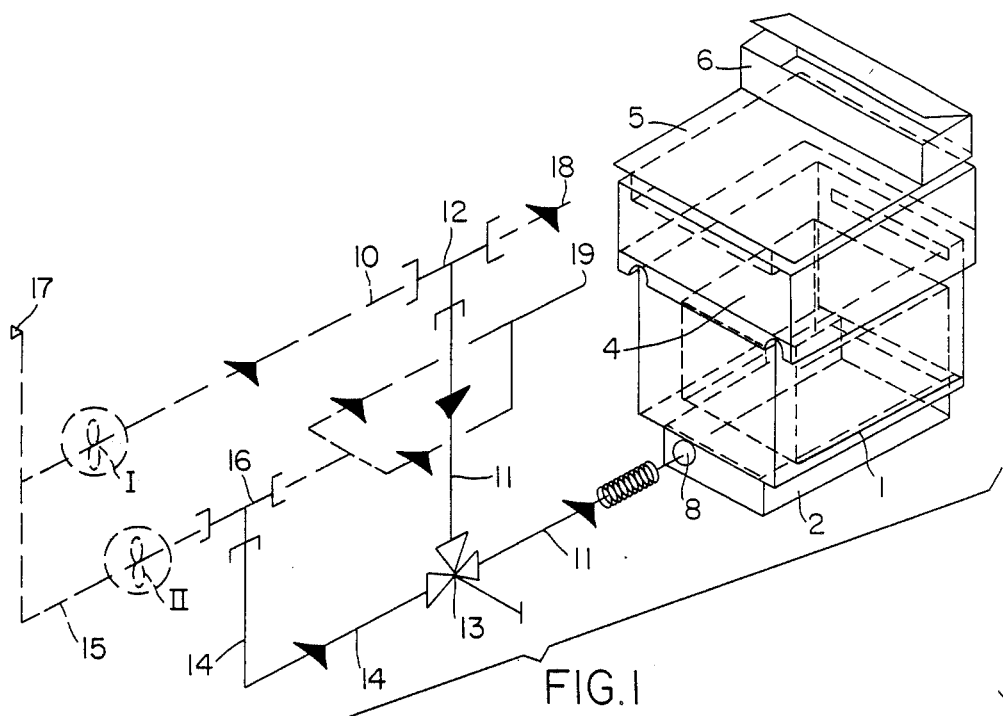
FIG.1
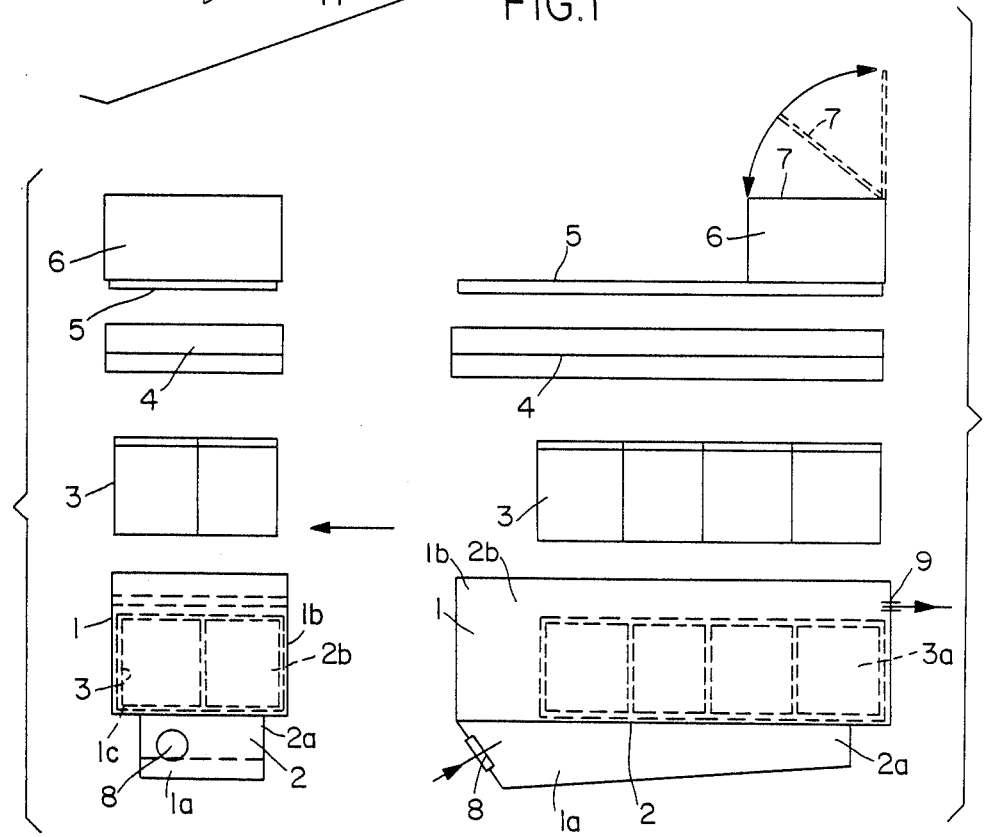
FIG.2
FIG.3

COOL-AIR COOLING BOX FOR MOTOR VEHICLES

BACKGROUND OF THE INVENTION

The present invention relates to cooling equipment in general, and more particularly to a cool-air cooling box for use in motor vehicles, especially in passenger cars and trucks.

When it is desired to transport in a motor vehicle, such as a passenger car or a truck, beverages and foodstuffs which are to be kept cold during the trip and are intended, for instance, for consumption either while travelling, or during a stop along the route, or at the final destination, it is already known to keep such beverages or foodstuffs in containers which thermally insulate their contents from the environment, so as to keep the warming-up of such contents to a minimum, such as in thermally insulated bottles or flasks, or in thermally insulating boxes, bags, pouches or the like. However, this approach has to be considered only as a temporary and stopgap measure, particularly since it does not render it possible to achieve continuous keeping of such contents in the desired cool or cold condition, and especially since it does not make it possible to accomplish controllable cooling action. Thus, it may happen that the foodstuffs or beverages being transported are too cold at the beginning of the trip, and too warm at the end of the trip.

SUMMARY OF THE INVENTION

Accordingly, it is a general object of the present invention to avoid the disadvantages of the prior art.

More particularly, it is an object of the present invention to provide a cooling arrangement for use in a motor vehicle, which cooling arrangement does not possess the drawbacks of the known arrangements of this type.

Still another object of the present invention is to devise an arrangement of the type here under consideration which renders it possible to achieve a continuous cooling of the foodstuffs or beverages to be transported in the motor vehicle, for the duration of the operation of such motor vehicle.

It is yet another object of the present invention to design the above arrangement in such a manner as not to consume any additional amounts of energy, or only a negligible amount of energy, for its operation.

A concomitant object of the present invention is so to construct the arrangement of the above type as to be relatively simple in construction, inexpensive to manufacture, easy to use, and yet reliable in operation.

In keeping with these objects and others which will become apparent hereafter, one feature of the present invention resides in a cooling arrangement for use in keeping cool edible substances, such as foodstuffs and/or beverages, while being transported in a motor vehicle having an outside air ventilation system and an air conditioning system, which cooling arrangement includes a cooling box including an internal space for accommodating the edible substances and having an air inlet and an air outlet situated across the internal space from one another; and a cooling system including a first and a second inlet respectively connected to the outside air ventilation system and to the air conditioning system of the motor vehicle, an outlet connected to the air inlet of the cooling box, and three-port valve means interposed between the inlets and the outlet of the cooling system and operative for selectively connecting the first and second inlets with the outlet of the cooling system and for controlling the amount of air flowing through the outlet of the cooling system and the air inlet into the internal space and then through the internal space and past the edible substances accommodated therein toward the air outlet of the cooling box to be discharged from the internal space through the outlet opening of the cooling box.

The cooling arrangement may be constructed in any desired manner; however, the cooling box construction proposed in the present application is particularly recommended. The cooling box may be so configured that it can be arranged between the driver's and the front passenger's seat of the motor vehicle. However, the cooling box may also be so configured that it can be arranged in an enlarged glove compartment of the motor vehicle, or in the trunk of the motor vehicle. Advantageously, the cooling box includes a bottom cooling component, an intermediate deposit component, and a lid component which has a receptacle for the accommodation of audio cassettes. The intermediate component may advantageously form a deposit shelf for the deposit thereon of various items, such as documents and the like. It is especially advantageous when the components of the cooling box are stacked on top of one another with a good fit and are dismountable from each other. The cooling box may further include a can holding frame dimensioned to be received in the internal space and operative for holding a plurality of, such as eight, cans, such as soda or beer cans, in a vibration-free manner. The internal space of the cooling box may have a bottom compartment for the accommodation of sandwiches or similar food items. The internal space of the cooling box may be subdivided in any desired manner.

In accordance with a particularly advantageous aspect of the invention, the cooling system of the cooling arrangement further includes a first T-shaped fitting interposed in the outside air ventilation system, a first conduit extending from the first T-shaped fitting to the three-port valve means, a second T-shaped fitting interposed in the air conditioning system, and a second conduit extending from the second T-shaped fitting to the threeport valve means. A particular advantage of the present invention is that, during the wintertime, the supply of the outside air to the items to be cooled is often sufficient for achieving the desired cooling effect, while the cooling system is switched over to the air conditioning system of the motor vehicle during the summertime. The control of the admission of the air either from the outside or from the air conditioning system is controlled by the three-port valve means. It is also possible to continuously maintain the interior of the cooling box at a constant temperature. Furthermore, the required cooling energy is supplied by the motor vehicle during the operation thereof at no extra cost. It is possible to install the cooling box and the cooling arrangement of the present invention in a motor vehicle of any kind which, in addition to an air conditioning system, also includes an outside air ventilation system.

According to another facet of the present invention, the air outlet of the cooling box has a slot-shaped configuration. The components of the cooling box may advantageously be of a synthetic plastic material, such as of Plexiglas, but they may also be of another material, such as of a light metal or of wood.

BRIEF DESCRIPTION OF THE DRAWING

The present invention will be described below in more detail with reference to the accompanying drawing in which:

FIG. 1 is a perspective view of a cooling box and of an associated cooling system of a cooling arrangement constructed in accordance with the present invention;

FIG. 2 is an exploded end elevational view of the cooling box of the present invention; and FIG. 3 is an exploded side elevation view of the cooling box of FIG. 2.

DETAILED DESCRIPTION OF THE PREFERRED EMBODIMENT

Referring now to the drawing in detail, and first to FIG. 1 thereof, it may be seen that the reference numeral 1 has been used therein to identify a bottom component of a cooling box constructed in accordance with the present invention. The bottom component 1 bounds an internal space 2. As illustrated particularly in FIGS. 2 and 3, the bottom component 1 includes a lower portion 1a and an upper portion 1b. The lower portion 1a of the bottom component 1 bounds a lower compartment 2a of the internal space 2, which may be used, for instance, for the accommodation therein of sandwiches or similar foodstuffs, while the upper portion 1b of the bottom component 1 bounds an upper compartment 2b of the internal space 2. As shown, the upper portion 1b of the bottom component 1 has dimensions exceeding the corresponding dimensions of the lower portion 1a of the bottom component 1, and the lower and upper compartments 2a and 2b of the internal space 2 are correspondingly configured and dimensioned, so that a ledge or a pair of ledges 1c is formed at the region of merger of the lower and upper portions 1a and 1b of the bottom component 1.

The cooling box of the present invention further includes a can holder component 3 which, in its position of use which is indicated in FIGS. 1 to 3 in dashed lines, is received in the upper compartment 2b of the internal space 2 of the bottom component 1 and rests on the ledge or ledges 1c. The ledge or ledges 1c prevent the can holder component 3 from descending into the lower compartment 2a of the internal space 2 and thus protects the contents of the lower compartment 2a from damage. As shown particularly in FIG. 2, the can holder component 3 does not have any significant leeway at least in the lateral directions in the upper compartment 2a of the internal space 2 of the bottom component 1, so that its movement in the internal space 2 is restricted. The can holder component 3 has a plurality of compartments 3a which are open at least in the upward direction to permit introduction of cans or similar receptacles thereinto and withdrawal of such receptacles therefrom. The can holder component 3 can be removed, together with any receptacles held therein, if any, from the internal space 2 of the bottom component 1.

An intermediate frame or intermediate shelf component 4 is arranged at the upper edge portion of the bottom component 1. The intermediate component 4 is constructed as a deposit or support shelf, for example, for documents or other papers and the like. On the intermediate component 4, there is placed, in the assembled condition of the cooling box of the present invention, a lid component 5 which is provided with a cassette container 6 that is closable by a lid 7. The components 1, 4 and 5 are so configured and dimensioned and have such surface properties that they are sealed with respect to one another in the assembled condition but that they can also be easily assembled with one another and disassembled, as desired.

The bottom component 1 is provided with an inlet opening which is in communication with the internal space 2 and serves 8 for the connection of a cooling air conduit 11 (see FIG. 1) thereto. As shown, the inlet opening 8 is provided in the lower portion 1a of the bottom component 1 and communicates with the lower compartment 2a of the internal space 2. An outlet slot 9 is provided in a region of the bottom component 1 that is situated oppositely to the inlet opening 8 and serves for discharging air from the internal space 2 of the bottom component 1 after such air has passed through the internal space 2 of the bottom component 1 and past any items accommodated in the internal space 2. As shown, the slot 9 is arranged at the upper edge region of the upper portion 1a of bottom component 1, so that the air admitted through the inlet opening 8 traverses both the lower and upper compartments 2a and 2b of the internal space 2 of the bottom component 1 before it reaches the outlet slot 9 and is discharged into the ambient atmosphere therethrough.

Having so described the construction of the cooling box of the present invention, the cooling system which supplies the cooling air to the cooling box will now be addressed with reference to FIG. 1 of the drawing. As shown therein, the cooling air conduit 11 is connected to a T-shaped fitting 12 which is interposed in a ventilating and heating air conduit 10. The conduit 10 is a part of the motor vehicle ventilating and cooling system and includes a blower I which propels outside and/or inside air, that may be heated by a non-illustrated heating device, into the conduit 10. The conduit 11 further includes a three-port valve fitting 13 which is situated between the T-shaped fitting 12 and the inlet opening 8 of the bottom component 1 of the cooling box of the invention. A further conduit 14 leads from another T-shaped fitting 16 that is interposed in an air conditioning air conduit 15, which is a part of the air conditioning system of the motor vehicle and includes a blower II which propels air passing through a non-illustrated cooling unit into the conduit 14, to the three-port valve fitting 13. The flow of the air to the cooling box can be controlled by the three-port valve fitting in any desired manner. The input of atmospheric air into the air circulation system occurs through an opening 17. The switching of the flow of air from the blower I or from the blower II into the inlet opening 8 of the cooling box is accomplished by means of the three-port valve fitting 13 in accordance with the need. Thus, during the wintertime, cool outside air is admitted into the inlet opening 8 from the blower I through the conduit 10, the T-shaped fitting 12, and through the conduit 11 and the three-port valve fitting 13 interposed therein. On the other hand, during the summertime, cooled air forced through the non-illustrated cooling unit of the motor vehicle by the blower II is admitted into the inlet opening 8 through the T-shaped fitting 16, the conduit 15, the three-port valve fitting 13, and a downstream portion of the conduit 11 which leads from the three-port valve fitting 13 to the inlet opening 8. The directions of flow of air through the system are indicated by respective arrowheads. The distribution of the ventilating and heating air from the conduit 10 in the interior of the motor vehicle occurs through an outlet end portion 18.

On the other hand, the distribution of the cooling air flowing in the conduit 15 from the air-conditioning unit into the interior of the motor vehicle takes place through an outlet end portion 19.

The cooling box according to the present invention, that may be partitioned or subdivided either in the illustrated manner or in any other desired manner, is advantageously made of a synthetic plastic material, such as Plexiglas, but it may also be made of other materials, such as light metal, wood, etc.

The cooling arrangement according to the present invention provides, in a reliable manner, a continuous, controllable cooling of the contents of the cooling box during the operation of the motor vehicle. The cooling box may be configured and dimensioned in such a manner that it can be accommodated in the space between the driver's and the front passenger's seat of the motor vehicle; however, it may even be accommodated in an enlarged glove compartment or even in the trunk of the motor vehicle.

For the operation during the summertime, it may also be provided in accordance with the present invention that the bottom component 1 is so constructed as to bound the internal space 2 in a liquid-impermeable and heat-insulated manner. Then, for accomplishing the desired cooling effect, manufactured ice in the form of cubes or pouches can be introduced into the component 2. The cooling box can then be transported in the motor vehicle even without being connected to any cooling system of such vehicle.

While the present invention has been described and illustrated herein as embodied in a specific construction of a cooling arrangement for use in a motor vehicle, it is not limited to the details of this particular construction, since various modifications and structural changes are possible and contemplated by the present invention. Thus, the scope of the present invention will be determined exclusively by the appended claims.

What is claimed is:

1. A cooling arrangement for use in keeping cool edible substances, such as foodstuffs and/or beverages, while being transported in a motor vehicle having an outside air ventilation system and an air conditioning system, comprising
   a cooling box including an internal space for accommodating the edible substances and having an air inlet and an air outlet situated across said internal space from one another; and
   a cooling system including a first and a second inlet respectively connected to the outside air ventilation system and to the air conditioning system of the motor vehicle, an outlet connected to said air inlet of said cooling box, and three port valve means interposed between said inlets and said outlet of said cooling system and operative for selectively connecting said first and second inlets with said outlet of said cooling system and for controlling the amount of air flowing through said outlet of said cooling system and said air inlet into said internal space and then through said internal space and past the edible substances accommodated therein toward said air outlet of said cooling box to be discharged from said internal space through said outlet opening of said cooling box, said cooling system also including a first T-shaped fitting interposed in the outside air ventilation system, a first conduit extending from said first T-shaped fitting to said three-port valve means, a second T-shaped fitting interposed in the air conditioning system, and a second conduit extending from said second T-shaped fitting to said three-port valve means.

2. The cooling arrangement as defined in claim 1, wherein said air outlet of said cooling box has a slot-shaped configuration.

3. The cooling arrangement as defined in claim 1, wherein said cooling box includes a bottom component, an intermediate component, and a lid component which has a receptacle for the accommodation of audio cassettes.

4. The cooling arrangement as defined in claim 3, wherein said intermediate component forms a deposit shelf for the deposit thereon of items, such as documents and the like.

5. The cooling arrangement as defined in claim 3, wherein said components of said cooling box are stacked on top of one another with a good fit and are dismountable from one another.

6. The cooling arrangement as defined in claim 3, wherein said components of said cooling box are of a synthetic plastic material.

7. The cooling arrangement as defined in claim 3, wherein said components of said cooling box are of a light metal.

8. The cooling arrangement as defined in claim 3, wherein said components of said cooling box are of wood.

9. The cooling arrangement as defined in claim 1, wherein said cooling box further includes a can holding frame dimensioned to be received in said internal space and operative for holding cans, such as soda cans, in a vibration-free manner.

10. The cooling arrangement as defined in claim 1, wherein said internal space of said cooling box is subdivided in a selected manner.

11. The cooling arrangement as defined in claim 1, wherein said cooling box is so configured that it can be arranged between the driver's and the front passenger's seat of the motor vehicle.

12. The cooling arrangement as defined in claim 1, wherein said cooling box is so configured that it can be arranged in an enlarged glove compartment of the motor vehicle.

13. The cooling arrangement as defined in claim 1, wherein said cooling box is so configured that it can be arranged in the trunk of the motor vehicle.

14. The cooling arrangement as defined in claim 1, wherein said bottom component is so constructed as to bound said internal space in a liquid-impermeable and heat-insulated manner.

15. The cooling arrangement as defined in claim 1, wherein said internal space is fillable as needed with manufactured ice in the form of cubes and/or pouches.

* * * * *